United States Patent Office 2,858,292
Patented Oct. 28, 1958

2,858,292

COMPOSITION CONTAINING COMPOUND STABILIZED WITH A TRITHIOCARBONATE

Gilbert H. Swart, Walter C. Warner, and Adolph Joseph Beber, Akron, Ohio, assignors to The General Tire and Rubber Company, Akron, Ohio, a corporation of Ohio No Drawing. Application October 8, 1953
Serial No. 385,022

1 Claim. (Cl. 260—45.8)

This present invention relates to the stabilization of film-forming, ethylenic compounds such as polyvinyl chloride, polyvinylidene chloride and the like. It particularly relates to an additive for such compounds which inhibits and minimizes stiffening and discoloration of the compounds on prolonged exposure to light, aging, and weathering.

At the present time, most polyvinyl chloride and polyvinylidene chloride material is plasticized with monomeric plasticizers to give flexible and pliable films and sheets. The monomeric plasticizers employed are liquids such as dioctyl phthalate, tricresyl phosphate and the like and are relatively volatile materials of low molecular weight. When mixed with vinyl compounds, these monomeric liquids tend to bleed and evaporate out of the polymer and in time the polymer becomes stiff and rigid. Since various additives can be employed to stabilize these polymers and otherwise improve them, the principal problem connected with their use is that of keeping and maintaining the monomeric plasticizers in the polymer as the polymer is used and ages.

In order to overcome the stiffening and bleeding problem presented by monomerically plasticized ethylenic compounds, rubbery polymeric plasticizers have been tried. Polymeric plasticizers have relatively high molecular weight, are solid and are much less volatile than monomeric plasticizers and have little or no tendency to bleed out of the polymer. For this reason, vinyl films plasticized with polymeric plasticizers have excellent non-stiffening and non-bleeding characteristics. The principal polymeric plasticizers used are rubbery compounds such as copolymers of butadiene with one or more of acrylonitrile and methyl isopropenyl ketone, fumaric esters and long chain, linear polyesters such as the polyester of an ethylene glycol and a dicarboxylic acid.

When polymeric plasticizers, particularly unsaturated diolefinic copolymers, are used to plasticize vinyl polymers, however, additional problems develop in that the compounds so plasticized are unstable and stiffen and discolor with prolonged exposure to sunlight and weather. Thus instead of stiffening because of loss of the plasticizer, they stiffen because of the action of light and weather on the unsaturated plasticizer molecule.

Attempts to stabilize such polymerically plasticized compounds against light and weather stiffening have proved very difficult. Many conventional additives are incompatible with either the polymeric plasticizers or the vinyl and vinylidene compounds, especially when they contain substantial proportions of halogen. Additives which are used to stabilize certain other film-forming materials have no effect on the polymerically plasticized vinyl and vinylidene halide compounds. Finally, it is even difficult to determine what causes the stiffening and discoloration and to evaluate what might overcome it.

It is thus one object of the subject invention to provide polymerically plasticized vinyl and vinylidene compounds which are light resistant and weather resistant.

It is another object of this invention to provide a stabilizer for polymerically plasticized vinyl and vinylidene compounds which is compatible with both the compound and the polymeric plasticizer and which makes them resistant to stiffening and discoloration upon prolonged exposure to light and weather.

Another object of the present invention is to provide a non-reactive, light stable, non-volatile, and compatible stabilizer for film-forming plastic compounds plasticized with polymeric plasticizers.

Still another object of the subject invention is to provide a method of stabilizing polymerically plasticized vinyl and vinylidene compounds and similar compounds to make them light and weather resistant.

Other objects and advantages will become apparent from the following detailed description of this invention.

In accordance with the present invention, I have discovered that when a trithiocarbonate compound is added to a film-forming plastic material, the trithiocarbonate acts as a stabilizer and inhibits discoloration and embrittlement of the material. Suitable trithiocarbonates are those within the formula:

in which $R_1$ and $R_2$ are alkyl, alkylenyl, aryl-alkyl, and aryl-alkylenyl groups. These groups are preferably free from amine, amine sulfonic acid, nitro, aliphatic diol, or peroxide groups. Suitable groups are ethylene, ethyl, propylene, propyl, butylene, butyl, amyl, hexyl, and the like. The groups should preferably not contain over 10 or 12 aliphatic carbon atoms or equivalents because this reduces their compatibility with the polymer and plasticizer. At the same time, the groups should contain at least two and preferably three to seven or eight carbon atoms so as to minimize odor and volatility. In any determination of chain length, a phenyl compound is considered equivalent to around 3.5 aliphatic carbon atoms. In addition to compounds within the preceding formula, we may also use alkylene trithiocarbonates or, in other terms, a trithiocarbonate in which a single divalent radical is joined to the two sulfur atoms. Examples of compounds contemplated by this invention are ethylene trithiocarbonate, diethyl trithiocarbonate, and 1,4 butylene trithiocarbonate.

These stabilizers are preferably used with polymerically plasticized polyvinyl chloride compounds and other film-forming compounds such as polyvinylidene chloride and polyvinyl alcohol.

In addition, they can be used with heterogeneous copolymer mixtures such as styrene-acrylonitrile with butadiene-acrylonitrile, styrene-acrylonitrile with butadiene-methyl isopropenyl ketone, styrene-methyl cinnamate with butadiene acrylonitrile and the like. They also have some stabilizing activity in other film-forming polymers such as polyethylene, copolymers containing a conjugated diolefine of less than seven aliphatic carbon atoms such a butadiene-styrene, butadiene-acrylonitrile, and isoprene-styrene systems, and chlorinated conjugated diolefines such as chloroprene.

Suitable polymeric plasticizers for polyvinyl chloride and polyvinylidene chloride are rubbery polyesters, butadiene-acrylonitrile copolymers, and methyl isopropenyl ketone-butadiene copolymers. The latter plasticizers are disclosed in copending U. S. Patent No. 2,669,553, issued February 16, 1954, and assigned to the same assignee as the assignee hereof. The subject invention is contemplated for use with all linear rubbery polymers and copolymers which are compatible with vinyl compounds and which plasticize them.

Suitable rubbery plasticizers are long chain substituted hydrocarbons preferably with a molecular weight of over 10,000 and with a vinyl cyanide or ketone group for each 6 to 30 aliphatic carbon atoms and preferably 8 to 20 aliphatic carbon atoms to render the same compatible with the vinyl compound. The carbon atoms noted are those exclusive of the cyanide or ketone group. Disregarding the ketone and cyanide groups, the plasticizer preferably consists of carbon and hydrogen atoms only or can consist of carbon and hydrogen atoms and halogen atoms such as chlorine.

The preferred plasticizers include copolymers of at least one conjugated diolefinic compound of less than 7 carbon atoms such as the diolefines 1,3 butadiene, 1,4 pentadiene, 2 methyl 1,3 butadiene, cyanoprene, 2 chloro 1,3 butadiene, and the like and chloroprene with hardners or solubilizing compounds such as acrylonitrile and methyl isopropenyl ketone. Terpolymers of a monoolefine such as isobutylene with a conjugated diolefine of less than 7 carbon atoms such as isoprene or 2 methyl butadiene with the above hardeners are also effective.

The following examples illustrate my invention:

EXAMPLE 1

A film was made up by copolymerizing butadiene and methyl isopropenyl ketone in accordance with the following recipe.

| | Parts |
|---|---|
| Butadiene | 50 |
| Methyl isopropenyl ketone | 50 |
| Soap | 5 |
| Potassium persulfate | ½ |
| Mercaptan modifier | ¼ |
| Water | 180 |

The above ingredients were mixed together and maintained in an autoclave for 8–14 hours at around 122° F. The reaction was allowed to go to 70–80 percent conversion and then the latex was removed from the autoclave and cooled.

Fifty parts (dry weight) of the resultant latex were mixed with 50 parts (dry weight) of polyvinyl chloride latex. Two parts (dry weight) of Santowhite (an alkylated phenol sulfide antioxidant) were also mixed in and latex mixture was coagulated with an acid-salt mixture such as that used in preparing GRS rubber as is well known in the art. The resultant crumb was filtered, dried and milled and calendered together with a lubricant and resin stabilizer to 4 mil. thick, clear film samples. This was the control. Other film samples were compounded in an identical manner except that two parts of diethyl trithiocarbonate, and ethylene trithiocarbonate were also added. The films were exposed in an Atlas Twin Ark Model DL–TS Weatherometer until they definitely became embrittled. The embrittlement rating was determined by the following formula: Rating equals hours to embrittlement minus 200 hours over 100 hours. The discoloration was rated visually. The results of this test are indicated in Table I below:

*Table I*

| Additive | Parts Stabilizer Per 100 of Polymer | Embrittlement rating | Discoloration at 200 hrs. |
|---|---|---|---|
| Control | | 1 | Very slight. |
| Diethyl trithiocarbonate | 2 | 4 | Do. |
| Ethylene trithiocarbonate | 2 | 4 | Slight. |

From the above data it is evident that small percentages of trithiocarbonate prevent light embrittlement and greatly increase the light stability and flexibility of the polyvinyl chloride film.

EXAMPLE 2

A film was made up by copolymerizing butadiene and acrylonitrile in accordance with the following charge:

| | Parts |
|---|---|
| Butadiene | 55 |
| Acrylonitrile | 45 |
| Soap | 5 |
| Potassium persulfate | ½ |
| Mercaptan modifier | ¼ |
| Water | 180 |

This was copolymerized at 122° F. for 8–14 hours to 70–80 percent conversion as in Example 1. This resulting latex was mixed with equal parts of solids by dry weight of polyvinyl chloride latex and the polymers salted out and the crumb dried and milled to film samples as in Example 1.

Two parts of diethyl trithiocarbonate were added to a film sample and tested as in Example 1. The resultant film had an embrittlement rating of 4 and discolored very slightly after 200 hours.

The trithiocarbonates of the subject invention can be made by reacting sodium sulfide with carbon disulfide to form sodium thiocarbonate ($Na_2CS_3$) and then slowly adding a chlorinated alkyl or alkene group to form the desired trithiocarbonate. The trithiocarbonates are generally insoluble liquids immiscible with the medium and are separated from it upon standing.

As previously noted, the preferable trithiocarbonates are those in which the $R_1$ and $R_2$ groups contain from three to seven aliphatic carbon atoms. Examples are dipropyl trithiocarbonate, di-isopropyl trithiocarbonate, dibutylene trithiocarbonate, dibutyl trithiocarbonate, diamyl trithiocarbonate, and dihexyl trithiocarbonate.

The trithiocarbonates of the subject invention are suitable form film-forming, polymerically-plasticized compounds formed from ethylenic radicals such as the mono-valent radical $—CH=CH_2$, the divalent radical $—CH=CH—$ and the divalent radical $H_2C=C=$. That is, these are used for vinyl compounds, vinylene compounds and vinylidene compounds and particularly halogen substituted compounds derived from the above radicals.

The polymeric plasticizers as noted are rubbery copolymers of conjugated diolefines and iso-olefines with stiffeners such as methyl isopropenyl ketone, acrylonitrile, and the like which are compatible with the ethylene compounds. These rubbery plasticizers may be compounded with accelerators and vulcanizing agents so that they are curable as desired. When the polymeric plasticizer is cured, it tends to become stiffer and more stable. The subject invention applies to the stabilization of compounds containing both curable and uncurable rubbery plasticizers.

The trithiocarbonates of the subject invention can be added to both clear and pigmented films and are beneficial in each. From .5 or 1 up to 12 parts and preferably 1 to 3 or 4 parts of trithiocarbonates should be added to the film-forming compound in order to render them light stable. The stabilizer is less effective in concentrations below 1 part although as low as .3 part has been found to have a beneficial effect. Concentrations in excess of eight parts provide diminishing benefits for the additional stabilizer added. There is thus no appreciable advantage in adding over 10 or 12 parts of stabilizer. Furthermore, certain stabilizers of the subject invention tend to become incompatible with the compound in the higher concentrations.

Although several embodiments of the invention have been herein shown and described, it will be understood that in accordance with the provisions of the patent statutes, numerous modifications of the examples shown may be resorted to without departing from the spirit of this invention.

What we claim is:

A film-forming composition comprising a polymer of a monomer selected from the group consisting of vinyl chloride and vinylidene chloride containing .5 to 12 percent of 1,4-butylene trithiocarbonate.

References Cited in the file of this patent

UNITED STATES PATENTS

| | | |
|---|---|---|
| 2,020,021 | Farrington et al. | Nov. 5, 1935 |
| 2,021,726 | Hess | Nov. 19, 1935 |
| 2,193,415 | Coltof | Mar. 12, 1940 |
| 2,430,562 | Fryling | Nov. 11, 1947 |
| 2,547,150 | Blake et al. | Apr. 3, 1951 |